RE 25255
April 26, 1960  H. C. BRANDT  2,933,939
FREE WHEELING BALL NUT AND SCREW ASSEMBLY
Filed Dec. 1, 1958
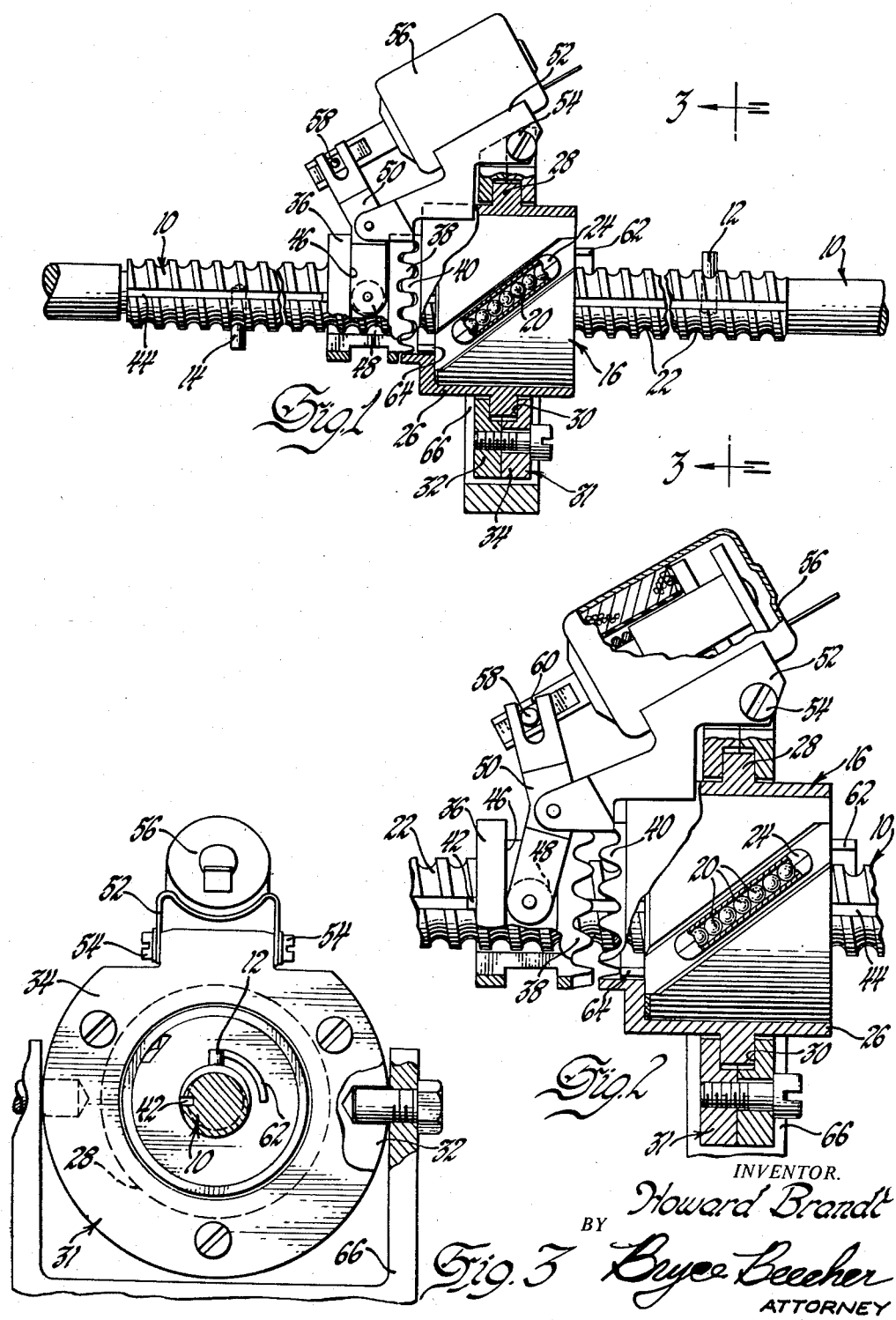
INVENTOR.
Howard Brandt
BY Boyce Beecher
ATTORNEY

United States Patent Office 2,933,939
Patented Apr. 26, 1960

2,933,939

FREE WHEELING BALL NUT AND SCREW ASSEMBLY

Howard C. Brandt, Saginaw, Mich., assignor to General Motors Corporation, Detroit, Mich., a corporation of Delaware Application December 1, 1958, Serial No. 777,479

6 Claims. (Cl. 74—424.8)

This invention concerns devices for translating rotary into linear motion and has particular relation to devices of this type which provide a mechanical advantage.

Mechanisms of the category indicated find wide application. In many cases, it is desirable to carry the relative movement between the principal parts, e.g., screw and nut, to a point marked by complementary stop means carried thereby. This presents the problem of preventing jamming at the limit of movement and such problem is especially acute where the connection between the parts is effected through anti-friction elements, as is frequently desirable.

The present invention has as its principal object to provide means whereby jamming of the parts at the stop or stops is precluded.

Another object is to prevent the jamming by means inducing rotation of the normally linearly moved component with the normally rotated component at the end of the stroke.

Still another object is to provide an assembly in the operation of which the principal parts may at any predetermined point or time be caused to rotate together without relative linear motion therebetween.

The invention will be better understood through reference to the accompanying drawings illustrating a preferred embodiment thereof. In the drawings:

Figure 1 is an assembly view, certain of the parts being shown in elevation, others in section or broken away;

Figure 2 is an enlarged fragmentary view with parts shown in section or broken away; and Figure 3 is a view on the line 3—3 in Figure 1.

In the drawings, the screw component 10 will be noted as provided with a pair of stops 12 and 14, the stop in each instance being a pin suitably secured in the screw.

A nut 16 carried by the screw 10 between the stops 12 and 14 interconnects with the screw via balls 20 which in operation of the unit travel a helical course set by the groove 22 and a complementary groove formed internally of the nut. A return or transfer tube 24 connects the ends of the groove in the nut and provides for endless travel of the balls. The operation of such ball nut and screw devices is well understood by those skilled in the art, being described, for example, in Hawkins Patent 2,267,524. Suffice it to say here that with one of the screw and nut held against axial movement and free to be rotated relative to the other, such other part will be caused to move linearly if restrained against rotary movement.

A pair of stops 62, 64 carried by the nut 16 are functional with relation to the pins 12 and 14. The nut is press fitted within a sleeve 26 provided with an annular rib 28. This rib is accommodated in an annular groove 30 in a housing component 31 formed by ring elements 32 and 34 shown interconnected by bolting. Rib 28 has a frictional fit in the groove 30 and it is a feature of the invention, as exemplified by the embodiment illustrated, that the coefficient of friction between the two parts is greater than that existing between the screw and nut.

Leftward of the nut 16 (Figures 1 and 2) will be seen a collar 36 having teeth 38 complementary to teeth 40 carried by the nut. This collar has a radially inwardly extending key 42 received in a groove 44 formed in the screw 10 and thus tends to rotate with the screw at all times. An annular groove 46 in the collar accommodates a roller 48 at the end of a lever 50, which may be bifurcated to carry another roller if desired.

A bracket 52 secured to the housing component 31, machine screw 54 being shown as the securing means, supplies pivotal support to the lever 50 and also supports a solenoid 56, the armature of which is operably connected to lever 50 via a pin and slot connection 58, 60.

It is important to observe that a slot 37 in the collar 36 enables the collar to pass beyond pin 14 without engaging the same.

As illustrated by Figure 3, housing component 31 is held against rotary movement by means of a bracket 66 which should be considered as connected to the load.

With the parts in their Figure 1 position, it should be clear considering the key and slot connection between collar 36 and screw 10 and the interengaging teeth 38 and 40 that rotation of the screw, which should be considered as supported by bearings precluding axial movement thereof, is accompanied by rotation of the collar 36 and nut 16. The latter rotates within the component 31 which, with the solenoid 56, is held against rotation by the load as reflected by bracket 66. Collar 36 is manifestly free to rotate relative to the solenoid 56 and the associated lever 50 by reason of the nature of the connection between the collar and lever. Now let it be assumed that the solenoid 56 is energized to displace the collar 36 as shown in Figure 2. This frees the nut 16 so that rotation of the screw thereafter becomes marked by linear movement of the nut, housing component 31 and solenoid 56 thereon. Collar 36 also moves linearly by virtue of its connection with the solenoid and the solenoid bracket, but its linear movement is accompanied by rotary movement thereof. Rotary movement of the nut is prevented, as previously indicated, by the relatively high coefficient of friction existing between the rib 28 and the walls of the groove 30 as compared to the friction coefficient between the screw and nut.

Assuming that the rotation of the screw 10 is in the direction causing rightward linear movement of the nut, on engagement of the stop 62 with the pin 12 the nut instead of moving further linearly on the screw rotates therewith, jamming of the two parts thereby being prevented. Such rotation of the nut occurs within the housing component 31 which, with the solenoid 56, remains stationary. At the leftward limit of movement of the nut the action, of course, is the same, i.e., when stop 64 engages pin 14, which is overridden by collar 36, the nut instead of jamming begins to rotate with the screw.

What is claimed is:

1. A device for translating rotary into linear motion comprising a screw having stop means thereon, a nut carried by said screw and having stop means complementary to said first stop means, said nut further including lock means, means carried by and connected to said screw in a manner permitting relative axial movement therebetween but preventing relative rotary movement therebetween, said last means carrying lock means complementary to said first lock means, and means carried by said nut for effecting engagement and disengagement of said complementary lock means, said device being characterized in operation in that with either of said complementary means in engagement rotation of either of said nut and screw induces rotation of the other.

2. A device for translating rotary into linear motion comprising a screw having stop means thereon, a nut carried by said screw and having stop means complementary to said first stop means, said nut further including lock means, means carried by and connected to said screw in a manner permitting relative axial movement therebetween but preventing relative rotary movement therebetween, said last means carrying lock means complementary to said first lock means, and means carried by said nut for effecting engagement and disengagement of said complementary lock means, said nut having rotary frictional engagement with the said means carried thereby, the latter being secured against rotary movement, said device being characterized in operation in that with either of said complementary means in engagement rotation of either of said nut and screw induces rotation of the other.

3. A device for translating rotary into linear motion comprising a screw adapted for rotation and having stop means thereon, a nut carried by said screw and having stop means complementary to said first stop means, said nut further including lock means, a collar element carried by and connected to said screw in a manner permitting relative axial movement therebetween but preventing relative rotary movement therebetween, said collar element carrying lock means complementary to said first lock means, and means restrained against rotary motion carried by said nut for effecting engagement and disengagement of said complementary lock means, said nut having rotary frictional engagement with said last means, the coefficient of friction therebetween being greater than that between said nut and said screw whereby with said lock means out of engagement said nut does not normally tend to turn with said screw when the latter is rotated, said device being further characterized in operation in that on engagement of said complementary stop means with said complementary lock means out of engagement said nut rotates with said screw relative to said means carried by said nut.

4. In a device for translating rotary into linear motion, said device providing a mechanical advantage, a screw adapted for rotation and having stop means thereon in the form of a pin extending therefrom in a plane normal to the axis thereof, a nut carried by said screw and having stop means complementary to said first stop means, said nut further including a series of teeth at one end thereof, a collar carried by said screw and including a key accommodated in a groove in said screw paralleling its axis and intersecting the threads thereof, said collar having teeth at its end nearest said nut complementary to the teeth of the nut, solenoid means carried by said nut for effecting axial movement of said collar to bring about engagement and disengagement of said complementary teeth, said solenoid means being restrained against rotary movement, said nut having rotary frictional engagement therewith, the coefficient of friction therebetween being greater than that between said nut and said screw whereby with said teeth out of engagement said nut does not normally tend to turn with said screw when the latter is rotated, said device being further characterized in operation in that on engagement of said complementary stop means with said teeth out of engagement said nut rotates with said screw relative to said solenoid means.

5. Nut and screw assembly in which the nut carries an annular rib through which it has rotary frictional engagement with a third member included in the assembly, said third member being formed with an annular groove for the accommodation of said rib and being held against rotation but moving linearly with the nut on rotation of the screw, the coefficient of friction between said third member and said nut being greater than that between said nut and screw whereby rotation of the latter does not normally induce rotation of the nut.

6. Nut and screw assembly in which the nut and screw carry complementary stop means and in which the nut mounts an annular rib through which it has rotary frictional engagement with a third member included in the assembly, said third member being formed with an annular groove for the accommodation of said rib and being held against rotation but moving linearly with the nut on rotation of the screw, the coefficient of friction between said third member and said nut being greater than that between said nut and screw whereby rotation of the latter does not normally induce rotation of the nut, said assembly being further characterized in operation in that engagement of said complementary stop means is marked by rotation of said nut and screw relative to said third member.

References Cited in the file of this patent
UNITED STATES PATENTS

| | | |
|---|---|---|
| 2,844,969 | Lohr | July 29, 1958 |
| 2,875,630 | Gill et al. | Mar. 3, 1959 |
| 2,875,631 | Syring | Mar. 3, 1959 |
| 2,875,632 | O'Rourke | Mar. 3, 1959 |